United States Patent [19]

Frankland

[11] Patent Number: 5,567,448
[45] Date of Patent: Oct. 22, 1996

[54] ROLL FOR PROCESSING UNIFORMLY FLAT PRODUCTS

[75] Inventor: James D. Frankland, New Castle, Pa.

[73] Assignee: New Castle Industries, Inc., New Castle, Pa.

[21] Appl. No.: 529,378

[22] Filed: Sep. 18, 1995

Related U.S. Application Data

[63] Continuation of Ser. No. 207,836, Mar. 8, 1994, abandoned.

[51] Int. Cl.⁶ .......................... B29C 43/24; B29C 43/46; B29C 43/52
[52] U.S. Cl. .......................... 425/363; 165/90; 425/384
[58] Field of Search .................... 425/363, 367, 425/373, 374, 384; 264/175; 165/89, 90

[56] References Cited

U.S. PATENT DOCUMENTS

| | | | |
|---|---|---|---|
| 242,058 | 5/1881 | Schürmann . | |
| 2,700,094 | 1/1955 | Hosack | 219/19 |
| 2,739,218 | 3/1956 | Wennerlund | 219/37 |
| 3,050,829 | 8/1962 | Appenzeller | 29/113 |
| 3,105,133 | 9/1963 | Norton | 219/19 |
| 3,328,866 | 7/1967 | Robertson | 29/116 |
| 3,625,280 | 10/1968 | Peter | 165/89 |
| 3,678,846 | 7/1972 | Bjorkegren | 100/155 R |
| 3,757,398 | 9/1973 | Urban | 29/116 |
| 3,840,958 | 10/1974 | Mahn | 29/110 |
| 3,852,860 | 10/1974 | Tewes | 29/110 |
| 3,857,664 | 12/1974 | Johnson et al. | 425/327 |
| 3,941,435 | 3/1976 | Tuomaala | 308/20 |
| 3,972,671 | 8/1976 | Aspin | 425/363 |
| 4,071,081 | 1/1978 | Chielsens et al. | 165/82 |
| 4,158,128 | 6/1979 | Evdokimov et al. | 219/469 |
| 4,506,727 | 3/1985 | Swasey | 165/90 |
| 4,741,079 | 5/1988 | Quehen | 29/116 |
| 4,781,795 | 11/1988 | Miller | 165/89 |
| 4,823,450 | 4/1989 | Ramisch et al. | 29/116.2 |
| 5,216,954 | 6/1993 | Thompson | 101/375 |

FOREIGN PATENT DOCUMENTS

| | | |
|---|---|---|
| 4025872 | 4/1991 | Germany . |
| 1208539 | 8/1969 | United Kingdom . |
| 1235691 | 6/1971 | United Kingdom . |
| 2099105 | 12/1982 | United Kingdom . |

OTHER PUBLICATIONS

William R. Penrod, *Performance and Design Data of Cooling Rolls on Polyethylene Extrusion Laminating Machines*, Aug. 1956, pp. 588–591, vol. 39, No. 8, Technical Association of the Pulp and Paper Industry.

Glenn Hayward, *Guide to Specifying Rolls for Sheet Extrusion*, Feb. 1977, pp. 79–81, Plastics Technology.

Partial Brochure Published by Eberhard Derichs, Maschinen-und Apparatebau, GmbH (publication date unknown).

Pages 1–5 of an Equipment Manual entitled: *Sheetmaster II Polishing Roll–Pull Roll System*, published by HPM Corporation of Mt. Gilead, Ohio (Exact publication date unknown).

Vol. 46, No. 12, Walzen–eine runde Sache, Gummi, Fasern, Kunststoffe, Dec. 1993.

*Primary Examiner*—Khanh P. Nguyen
*Attorney, Agent, or Firm*—Kirkpatrick & Lockhart LLP

[57] ABSTRACT

A roll with an axially extending core having a central portion and two end portions. A shell member that has a central portion and two distal end portions surrounds the core and is attached to the core at their respective central portions such that the distal end portions of the shell member are unsupported to enable them to deflect in relation to the adjacent end portions of the core. The core has a duct therein that communicates with at least one substantially annular passageway provided in the shell member for permitting a temperature controlling fluid medium to flow to the passageway from a source that is attached to the duct.

4 Claims, 6 Drawing Sheets

# ROLL FOR PROCESSING UNIFORMLY FLAT PRODUCTS

This is a continuation of application Ser. No. 08/207,836, filed on Mar. 8, 1994, now abandoned.

BACKGROUND OF THE INVENTION

1. Field of the Invention

The present invention relates to process rolls and, more particularly, is directed to rolls for processing uniformly flat products such as polymer sheet.

2. Description of the Invention Background

Rolls of many types and sizes are used for processing a variety of flat materials such as steel plate, paper, fabric, rubber, polymeric materials, etc. Typically, the material is passed through a series of stacked, temperature controlled rolls that serve to flatten the material into a continuous sheet or web having a desired thickness.

In many applications, it is critical for the sheet material to be formed with a uniform cross-sectional thickness. For example, polymer sheet used in the packaging industry for creating packages, commonly known as "bubble packs" is typically heated and vacuum formed into packages that have cavities that conform to the shape of the packaged articles. If the raw polymer sheet does not have a uniform cross-sectional thickness, it can ultimately lead to improperly formed parts when it is vacuum formed.

A flat sheet extrusion system of the type that is typically used to extrude molten polymer material into a flat sheet is depicted in FIG. 1. Such system, generally designated as 110, comprises a roll stand 112, a closed loop temperature control recirculating system 114, a cooling conveyor 116 and a pull roll assembly 118.

The roll stand 112 typically supports three driven "polishing" rolls (120, 130, 140) that are arranged in a stacked configuration as shown in FIGS. 1 and 2. In a roll arrangement known as a "downstack" the molten material, generally designated as 150, exits the die of an extruding machine (not shown) and is immediately pulled into the "nip" 121 between rolls 120 and 130 as shown in FIG. 2. The material 150 then passes around roll 130, enters the nip 131 between rolls 130 and 140, and passes around roll 140 to be received on cooling conveyor 116. In an "upstack" arrangement, the molten material 150 would enter the nip 131 between rolls 140 and 130, pass around roll 130 into the nip 121 between rolls 130 and 120 and pass around roll 120 to an adjacent cooling conveyor.

In most flat sheet extrusion arrangements, a pull roll assembly 118 is used to keep tension in the extruded flat sheet as it exits the final polishing roll. Slitting apparatus 119 is typically mounted on the cooling conveyor 116 for removing the outer edges of the sheet which, due to irregular cooling, are not uniformly flat. After the material 150 exits the pull rolls 118, it can be continuously rolled on a core (not shown) or, in applications wherein the sheet is relatively thick (i.e., greater than ⅛"), the material can be cut into sheets and stacked.

FIG. 3 illustrates a cross-sectional elevational view of rolls 120 and 130. As can be seen in that Figure, roll 120 has a shell 122 that is coaxially received on two journal portions 124. Roll 130 is similarly constructed and has a shell 132 that is coaxially received on two journals 134. The journals 134 of roll 130 are received in corresponding bearings 136 that are non-movably mounted to the roll support structure 112. Although journals 134 can freely rotate, the position of the roll 130 typically cannot be adjusted.

The journals 124 are supported in bearings 126 that are movably mounted to the support structure such that the positions of the bearings 126 can be adjusted in the directions depicted by arrows A' to achieve a desired amount of distance between shells 122 and 132 which ultimately will correspond to the thickness of the extruded sheet. As the sheet thickness is reduced, the molten polymer 150 typically tends to cool quicker because of its smaller mass as it contacts the first set of polishing rolls (120, 130). Such cooling causes the material 150 to stiffen and generate greater "separating" forces, collectively designated by arrow 152. These forces are generated by the material's resistance to deformation (i.e., the material's viscoelasticity). As can be seen from FIG. 3, the separating forces 152 tend to separate the shells (122, 132) as the polymer material 150 passes therebetween. To counteract the separating forces 152, the bearings 126 are typically loaded in the direction depicted by arrows 154 such that roll 120 is held under pressure relative to roll 130. However, such arrangement typically causes the rolls (120, 130) to deflect as shown in FIG. 3 which ultimately causes the extruded sheet 150 to acquire a "lens-like" cross-sectional shape.

When extruding polymeric sheet materials, the material must be cooled at a desired rate as it passes between and around the polishing rolls. Therefore, the polishing roll shells are typically hollow so that a liquid cooling medium can be pumped therein. It will be appreciated that, because the heat transfer takes place through the roll shell, relatively thin walled shells exhibit the best heat transfer capabilities.

It has been found that the deflection of such hollow-shell rolls can be reduced by increasing the shell wall thickness. However, rolls having relatively thick walled shells are more expensive to fabricate and exhibit poor heat transfer properties. Thus, prior rolls with high heat transfer requirements are not well suited for flat sheet extrusion operations wherein roll deflection must be minimized.

A variety of other rolls have been developed to minimize roll deflection. For example, U.S. Pat. No. 242,058 to Schürmann, discloses various roll embodiments that generally comprise a cylindrical body member that is coaxially received on or mounted to an axle. In one embodiment, the body member has a solid center portion and two axle or journal portions that extend outwardly from the solid center portion. The ends of the body portion are provided with recesses that extend around the corresponding axle portions to permit the ends of the body member to independently deflect relative to the adjacent axle portions. Schürmann discloses that his rolls can be used in connection with conventional rolls because they are able to adapt closely to shape of the conventional rolls. The Schürmann roll, however, lacks heat transfer means for controlling the temperature of the material that contacts the roll face.

Another roll is disclosed in U.S. Pat. No. 4,158,128 to Evdokimov et al. The roll disclosed in this patent comprises a core and an outer shell that is attached to the core. The shell is formed from two coaxial pipes that have corresponding center portions and end portions. The inner pipe is attached to the center portion of the core and the outer pipe is attached to the inner pipe in their middle portions and at their end portions. Such shell construction permits the outer pipe to flex in a wave-like manner when loads are applied to the face of the outer pipe and the core journals. This patent discloses that by proper selection of the degrees of stiffness of the core and the outer pipe, the supported portions of the outer pipe will lie in a straight line. The ends of the inner and outer pipes of the Evdokimov et al. roll may also be hermetically sealed such that a heating or cooling fluid may be admitted into the passage located between the inner and outer pipes. This temperature controlling medium is supplied to the passageway by pipelines that extend from one core journal into one end of the passageway. Because those pipelines support the ends of the shell relative to the core, they would also cause the shell to deflect in a wave like manner. Thus, this roll is not well suited for use with a conventional roll because a conventional roll face typically deflects in an arcuate manner. Also, due to its wave-like deflection pattern, the Evdokimov et al. roll would be ill-suited for applications wherein there can be little or no variation in the sheet thickness across the width of the sheet.

U.S. Pat. No. 4,823,450 to Ramisch et al. discloses a flex-compensated roll that comprises an outer roller shell that is supported on a core by a hydraulically operated support member that serves to support the outer roller shell relative to the core. Hydraulic fluid is pumped to the expandable and contractible support member located between the core and the outer roller shell to compensate for sagging of the outer roller shell. The temperature of the outer roller shell may be controlled by controlling the temperature of the hydraulic fluid. This roll arrangement, however, requires additional hydraulic fluid control equipment to be used.

Thus, there is a need for a roll that has high heat transfer capabilities that may be used in connection with a conventional roll to extrude flat sheet having a substantially uniform cross sectional thickness.

There is a further need for a roll having the above-mentioned characteristics that is lighter and more economical to fabricate than prior roll designs.

SUMMARY OF THE INVENTION

In accordance with a particular preferred form of the present invention, there is provided a roll comprising an axially extending core that has a central portion and two end portions and a shell member that has a central portion and two distal end portions. The shell member surrounds the core and is mounted to the core at their respective center portions whereby the distal end portions of the shell are unsupported and are permitted to deflect in relation to the adjacent end portions of the core. The core is also provided with a duct that communicates with at least one annular passageway in the shell member to permit a fluid medium to flow through the duct to the annular passageways.

Accordingly, the present invention provides solutions to the aforementioned problems associated with prior rolls used in extrusion systems for extruding flat sheet materials having a uniform cross-sectional thickness. In particular, when used with a conventional roll, a uniform amount of clearance can be maintained between the rolls regardless of the separating forces generated by designing both rolls for equal but opposite deflection. Additionally, the present roll can be used in connection with similarly constructed rolls to reduce the amount of roll deflection typically encountered when using conventional roll arrangements. The skilled artisan will appreciate, however, that these and other details, objects and advantages will become apparent as the following detailed description of the present preferred embodiment thereof proceeds.

BRIEF DESCRIPTION OF THE DRAWINGS

In the accompanying drawings, there is shown a present preferred embodiment of the invention wherein like reference numerals are employed to designate like parts and wherein.

DETAILED DESCRIPTION OF PREFERRED EMBODIMENTS

Figure 4:
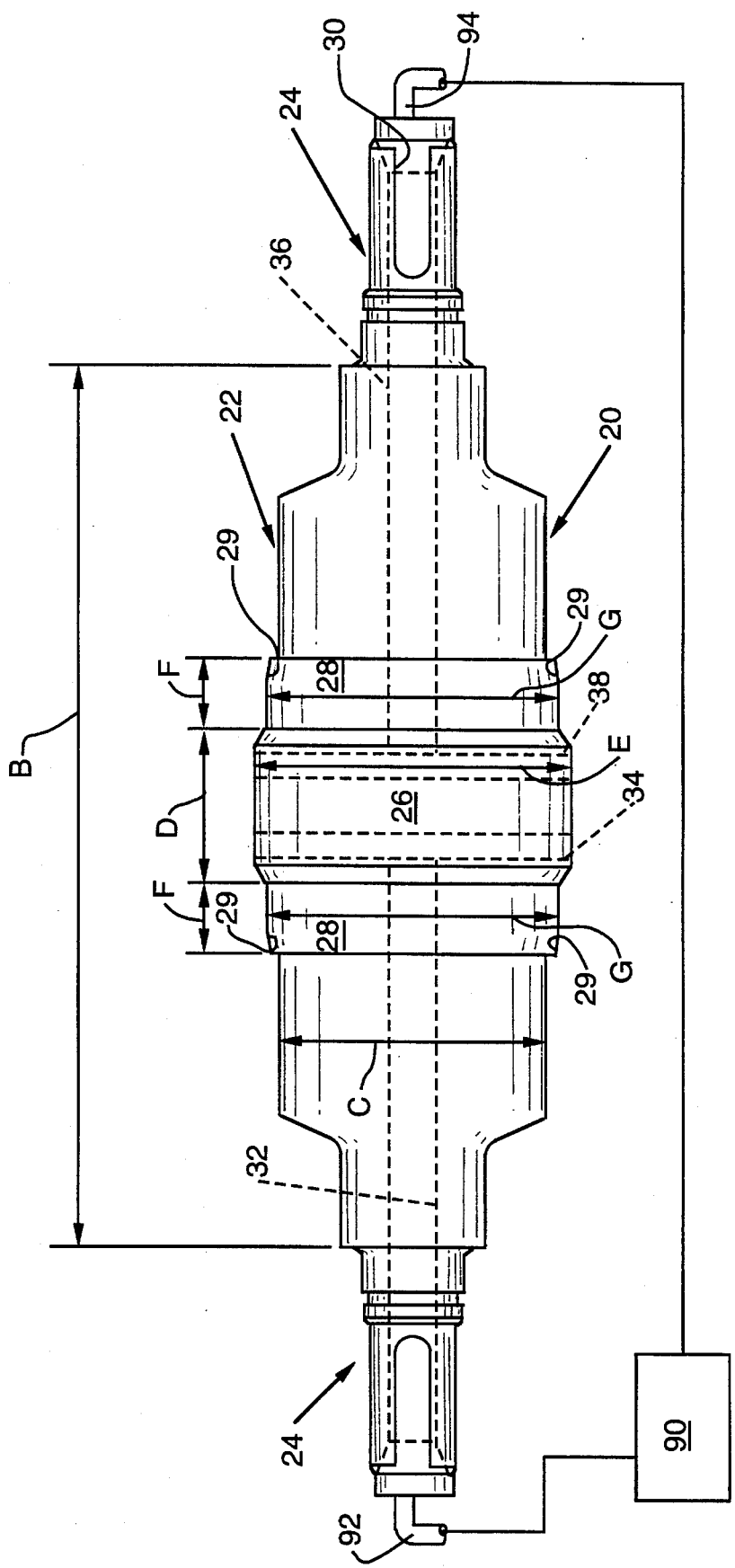
FIG. 4 is a side view of a preferred core member of the roll of the present invention.
Figure 5:
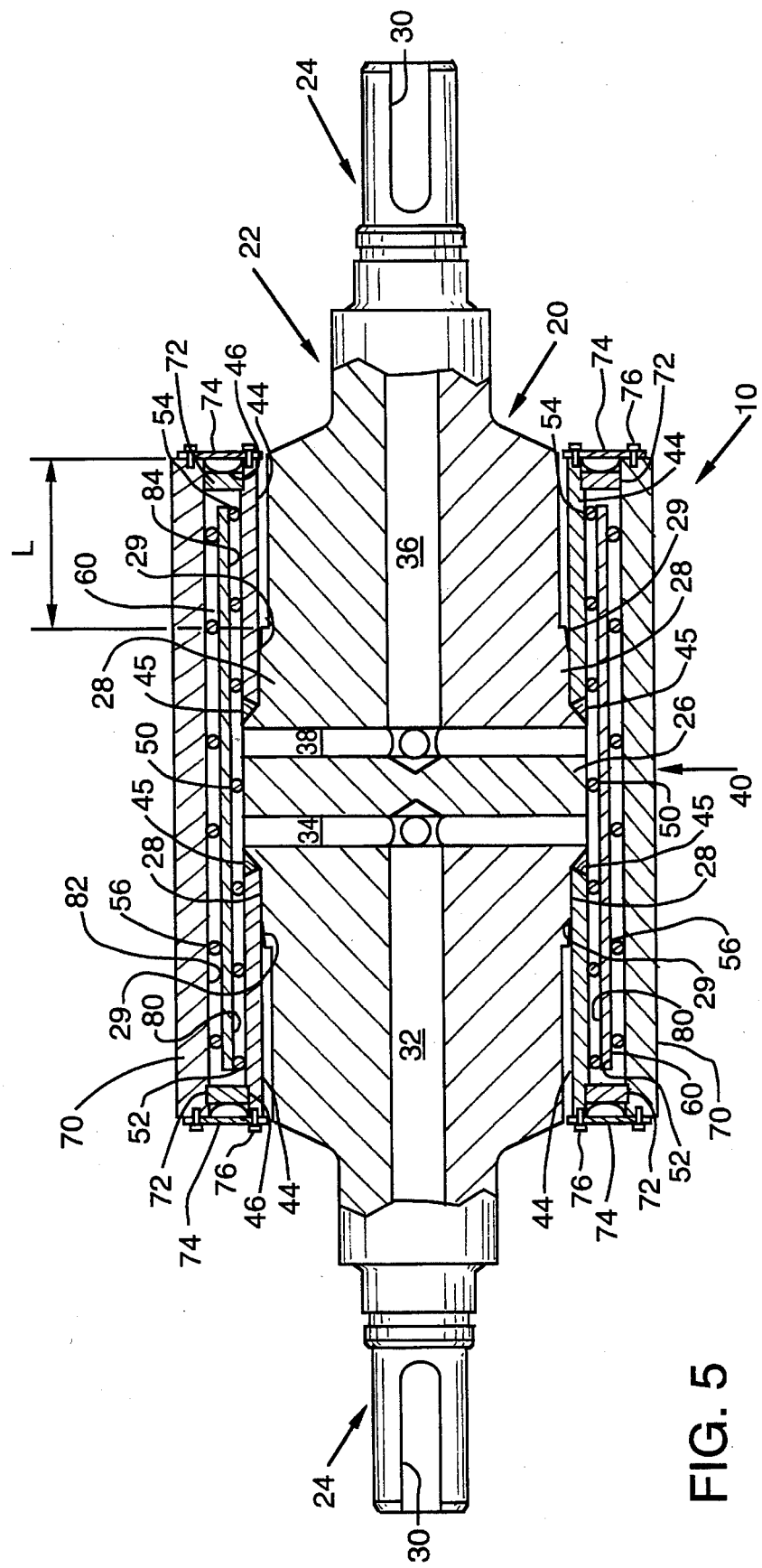
FIG. 5 is a partial cross-sectional view of a preferred roll of the present invention.
Figure 6:
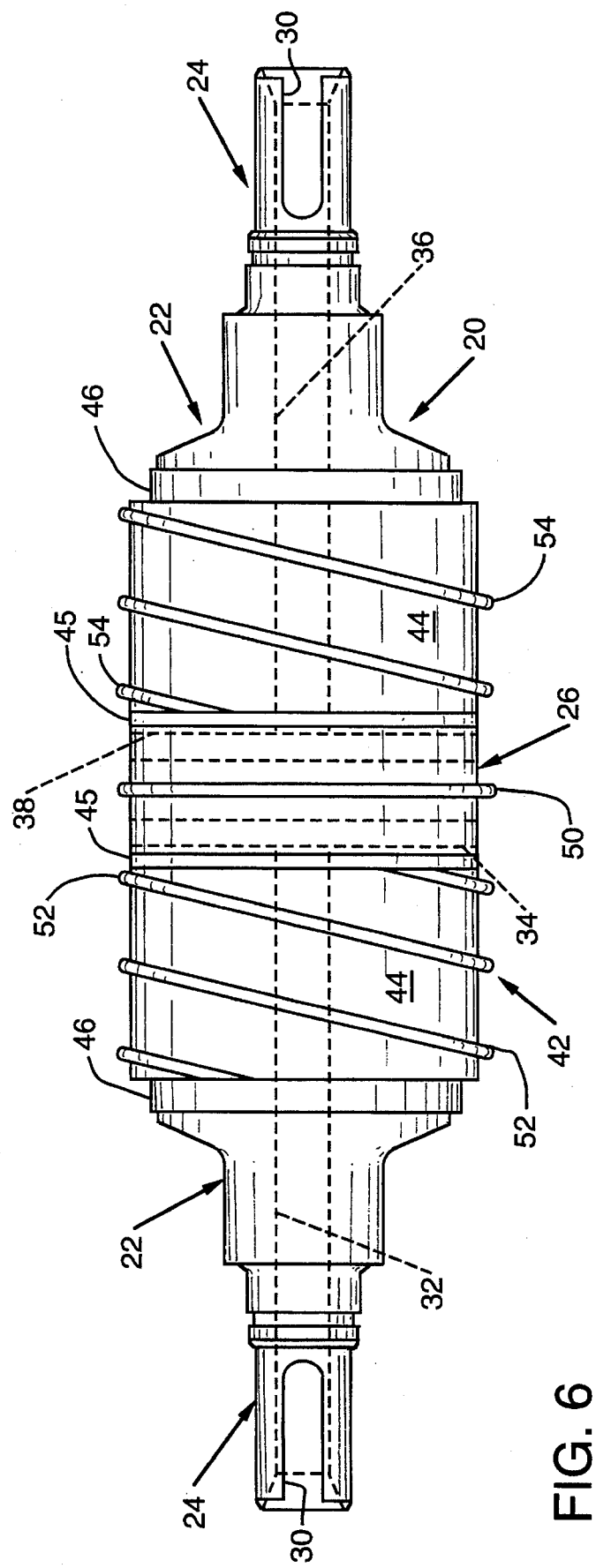
FIG. 6 is a side view of a roll core and inner shell assembly of a preferred roll of the present invention.

Referring now to the drawings for the purposes of illustrating a present preferred embodiment of the invention only and not for purposes of limiting the same, FIGS. 4–6 depict a preferred roll member, generally designated as 10, that comprises a shell assembly 40 that is coaxially received on an axially extending core member 20. More particularly and with reference to FIG. 4, a preferred core member 20 has an elongated cylindrical axle portion 22 which terminates in journal portions 24. The axle portion 22 has a "face" length, generally designated as "B", and a first diameter, designated as "C". As can also be seen in FIG. 4, axle portion 22 also preferably has an enlarged coaxial center segment 26 that has a width "D" and a diameter "E". Extending outwardly from each side of center segment 26 are coaxial intermediate segments 28 that each have a width "F" and a diameter "G". Preferably, diameters "G" are larger than diameter "C" and diameter "E" is larger than diameters "G". By way of example, in a preferred embodiment, face length "B" is approximately 71" diameter "C" is approximately 7", width "D" is approximately 5⅝", diameter "E" is approximately 8¼", width "F" is approximately 2¹¹⁄₁₆", and diameter "G" is approximately 7½". The skilled artisan will appreciate, however, that the widths and diameters of the body portion 22 and segments 26 and 28 may vary depending upon the type of process in which it is used.

In a preferred embodiment, journal portions 24 are machined in a known manner such that they may be received in corresponding conventional bearings or pillow blocks that are mounted to flat sheet processing equipment. Preferably, each journal 24 has a keyway 30 machined therein to facilitate non-rotational attachment of the journal 24 to a corresponding conventional drive mechanism such as a gear or sprocket.

As shown in FIGS. 4 and 5, core 20 preferably has a first axial passageway or duct 32 therein that extends axially through a journal 24 into the center of the axle portion 22 wherein it intersects a radially extending duct 34 that is provided in center segment 26. Similarly, a second axial passageway or duct 36 axially extends from the other journal end 24 into the center of the axle portion 22 wherein it intersects a radially extending duct 38 that is provided through the center roll segment 26. As will be further discussed below, ducts (32, 34) and (36, 38) serve to provide passageways for supplying a liquid temperature controlling medium to the shell assembly 40 in a "closed loop" arrangement.

As can be seen in FIGS. 5 and 6, an inner shell assembly, generally designated as 42, is formed from two cylindrical inner shell members 44 that are coaxially received on intermediate segments 28 such that they extend outwardly from center segment 26 of core 20. In a preferred embodiment, inner shell members 44 are fabricated from steel tubing having an 8¼" nominal outer diameter and a ⅜" wall thickness. However, inner shell members 44 can be fabricated from a variety of other types and sizes of materials. As can also be seen in FIGS. 5 and 6, inner shell members 44 are preferably welded to the center segment 26 and corresponding intermediate segments 28 by welds 45. However, cylindrical shell members 44 may be attached by a myriad of other known mechanical fasteners, such as, for example, appropriately sized countersunk screws provided that a hermetic seal can be established and maintained between the shell members 44 and the center segment 26.

The reader will appreciate that above-mentioned method for attaching the inner shell members 44 to the core 20 results in each of the inner shell members 44 being cantilevered from its corresponding intermediate core segment 28. In a preferred embodiment, the outer ends of each intermediate core segment 28 is provided with an arcuate surface 29 to facilitate deflection of the corresponding inner shell member 44 in a direction toward the axis of the core 20.

As can also be seen in FIGS. 5 and 6, a collection of spacer members are wound around the outer circumference of the inner shell assembly 42. Preferably, a first spacer member 50 is wound around the center segment 28 to form a continuous annular band that is positioned between ducts (34, 38). A second continuous spacer member 52 is wound around one of the inner shell segments 44 as shown in FIG. 6. Preferably, spacer member 52 is wound around inner shell segment 44 in a pattern that comprises one or more wraps at a desired lead based on other design considerations such as roll diameter and the desired flow rate and thickness of the material to be extruded. For example, in rolls having diameters under 30" and material flow rates of 5–6 feet/second, two to six wraps may be successfully used. However, many other spiral arrangements may also be used. A third spacer member 54 is wound around the other inner shell member 44 in a pattern that matches the wrap pattern of the spacer member 52. In a preferred embodiment, spacers (50, 52, 54) each comprise a continuous length of ¼" diameter steel wire that is welded to the inner shell assembly 42 in the above-described arrangement. However, the skilled artisan will appreciate that spacers (50, 52, 54) can comprise other materials of various shapes and sizes and be attached to the inner shell assembly 42 in a variety of other suitable configurations.

A middle shell member 60 is preferably received on the wraps of spacer members (50, 52, 54) such that it is substantially coaxial with the core member 20. In a preferred embodiment, middle shell member 60 is fabricated from steel tubing having a nominal outer diameter of 9½" and a ⅜" wall thickness. Preferably, the outer surfaces of spacer members (50, 52, 54) are machined to enable a 0.003"–0.005" shrink fit to be established between the spacer members (50, 52, 54) and the middle shell member 60. The skilled artisan will appreciate, however, that middle shell member 60 may be attached to spacer members (50, 52, 54) in a preferred coaxial position by other suitable fastening methods.

As can also be seen in FIG. 5, a fourth spacer 56 is also preferably attached to the outer circumference of the middle shell member 60. In a preferred embodiment, spacer 56 comprises a ¼" diameter steel wire that is welded to the middle shell member 60 in a pattern that comprises four wraps arranged in a 14" right hand lead. However, spacer 56 may vary in size and shape and may be attached to the middle shell member 60 in a variety of other suitable manners and arrangements.

To complete the shell assembly 40, an outer cylindrical shell member 70 is received on the outer surfaces of the spacer 56 such that outer shell member 70 is substantially coaxial with core member 20. In a preferred embodiment, the outer shell member 70 is attached to the inner shell assembly 42 by end plates 72. In particular, as can be seen in FIG. 5, each end plate 72 is preferably received on a recessed end portion 46 of a corresponding inner shell member 44. The end plates 72 are preferably welded to the corresponding inner shell member 44 and outer shell member 70 to create a hermetic seal therebetween.

As can be seen in FIG. 5, spacer members 50 and 52 cooperate with one inner shell member 44 and the inside surface of the middle shell member 60 to create a first substantially annular or spiral passageway generally designated as 80. Similarly, a second substantially annular or spiral passageway 82 is defined by spacer member 56 and the middle shell member 60 and the outer shell member 70. A third substantially annular or spiral passageway 84 is defined by spacer members 50 and 54 and the other inner shell member 44 and the middle shell member 60. The purpose and operation of the passageways (80, 82, 84) will now be described.

The passageways (80, 82, 84), in cooperation with ducts (32, 34, 36, 38), enable a liquid heat transferring liquid (i.e., chilled or heated fluid) to be pumped through the shell assembly 40 to control the temperature of the material passing around the roll. As shown in FIG. 4, the roll 10 is preferably used in connection with a conventional source of heat transfer fluid, such as an appropriately sized heater or chiller unit, generally designated as 90. The source 90 may be attached to one of the journal ends 24 by an appropriate supply conduit 92 which serves to supply the liquid medium to the duct 32 in the roll core 20. The liquid medium travels through duct 32 and into radially extending duct 34 which is in liquid communication with the first spiral passageway 80. The liquid travels through the first spiral passageway 80 and into the second spiral passageway 82. After flowing through the second spiral passageway 82, the liquid flows into the third spiral passageway 84 and into duct 38. After flowing through duct 38, the liquid flows through duct 36 and into a return conduit 94 that is connected to the source 90. Thus, the heat transfer liquid may be continuously pumped through the collection of ducts and passageways to cool or heat the shell assembly 40 to a desired temperature. The reader will also appreciate that the direction of flow of the liquid medium may be reversed without affecting the heat transfer capabilities of the roll 10 although other pressure and flow related effects may occur. The skilled artisan will also appreciate that suitable mechanisms using electrical heating by induction or resistance methods or a cooling mechanism using heat pipes or vaporization techniques could be used to accomplish the heat transfer requirements without losing the ability to control the ultimate flatness of the sheet material.

Also in a preferred embodiment, a cover member 74 is preferably attached to each end of the shell assembly 40 to prevent dirt and debris from entering the gap between the inner shell members 44 and the axial portion 22 of core 20. Preferably, cover members 74 are fabricated from a flexible material such as steel sheet, and are attached to the ends of the inner shell members 44 and the outer shell member 70 by conventional button head cap screws 76. However, other types of material and conventional fasteners may be used.

Figure 7:
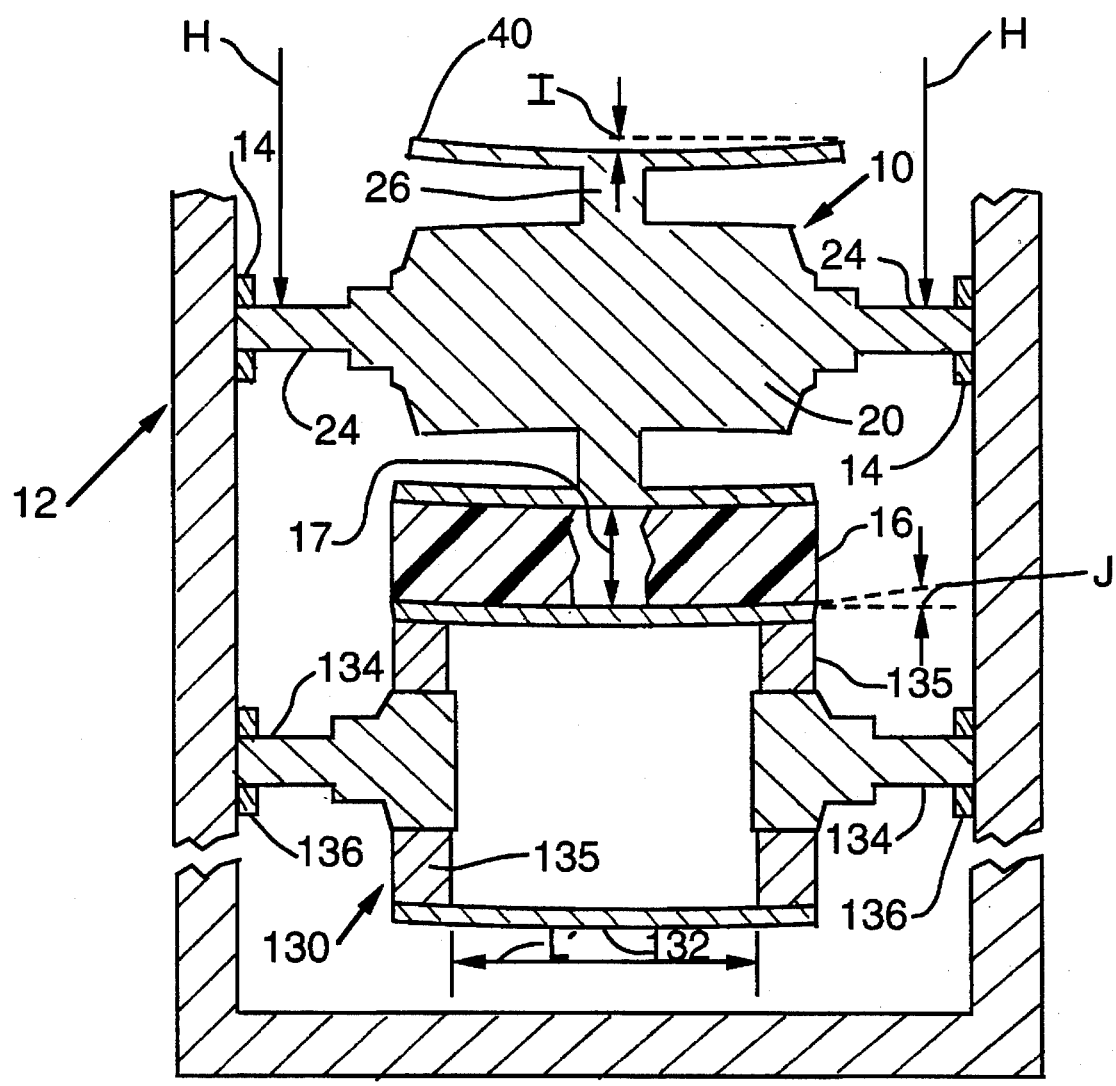
FIG. 7 is a diagrammatic side elevational view of a preferred roll of the present invention used in connection with a conventional roll to extrude flat sheet material therebetween.

FIG. 7 is a diagrammatic illustration of a roll 10 of the present invention constructed in the manner described above and being used in connection with a conventional roll 130 in a conventional flat sheet extrusion apparatus generally designated as 12. Such diagrammatic representation is useful in depicting the deflection characteristics of the rolls 10 of the present invention when used in connection with conventional rolls. However, while FIG. 7 depicts the shell assembly 40 of roll 10 as being supported on an enlarged center segment 26 of core member 20 such that the ends of the shell assembly 40 can deflect relative to the core 20, the reader will appreciate that the roll 10 is fabricated in the manner described above and depicted in FIGS. 4–6.

As can be seen in FIG. 7, conventional roll 130 comprises a roll shell 132 that is coaxially received on end caps 135 that are coaxially supported and attached to journals 134. The journals 134 of roll 130 are received in corresponding bearings 136 that are nonmovably mounted to the extrusion apparatus 12.

The journals 24 of the roll 10 are mounted in bearings 14 that are attached to apparatus 12 such that they may be selectively adjusted to increase or decrease the amount of clearance provided between the shell assembly 40 and the roll shell 132. It will be appreciated that the amount of clearance provided between the shell assembly 40 and the roll shell 132 will dictate the ultimate thickness of the extruded sheet.

During operation, the molten material, generally indicated as 16, is caused to enter the nip between the shell assembly 40 and the roll shell 132 of the conventional roll 130. As the material 16 passes between the shell assembly 40 and roll shell 132, it typically generates separation forces, collectively represented by arrow 17, that tend to cause the shell assembly 40 to move away from roll shell 132. To counteract the separation forces 17, the bearings 14 are adjusted by known mechanical, pneumatic or hydraulic adjustment devices to force the journals 24 of roll 10 towards the journals 134 of roll 130. Such known bearing adjustment equipment also serves to retain the journals 24 in that operating position. In FIG. 7, the amount of force applied to the journals 24 by positioning the bearings 14 relative to the bearings 136 are represented by arrows "H". The amount of deflection "I" of shell assembly 40 of roll 10 can be predicted by the following formula that is well known in the art:

$$\text{Deflection ("I")} = \frac{\text{Load} \times (\text{Length})^3}{8EI}$$

Wherein: Load=the separating force+roll weight;
Length=the unsupported shell length "L" (see FIG. 5);
"E"=the modulus of elasticity of the material comprising shell 40; and
"I"=the moment of inertia of the roll 10.
Similarly, the amount of deflection "J" of roll shell 132 of roll 130 can be predicted by the following formula that is well known in the art:

$$\text{Deflection ("J")} = \frac{5 \times \text{Load} \times (\text{Length})^3}{384EI}$$

Wherein: Load=the separating force+roll weight;
Length=the unsupported shell length "L'" (see FIG. 7);
"E"=the modulus of elasticity of the material comprising shell 40; and
"I"=the moment of inertia of the roll 130.

The skilled artisan will appreciate that by utilizing the above-identified formulas, roll 10 of the present invention can be designed such that the deflection "I" of the shell assembly 40 will substantially match the deflection "J" of a corresponding conventional roll 130 such that a uniform amount of clearance can be maintained between the shell assembly 40 and the roll shell 132 during flat sheet extrusion operations such as the one described above.

Figure 1:
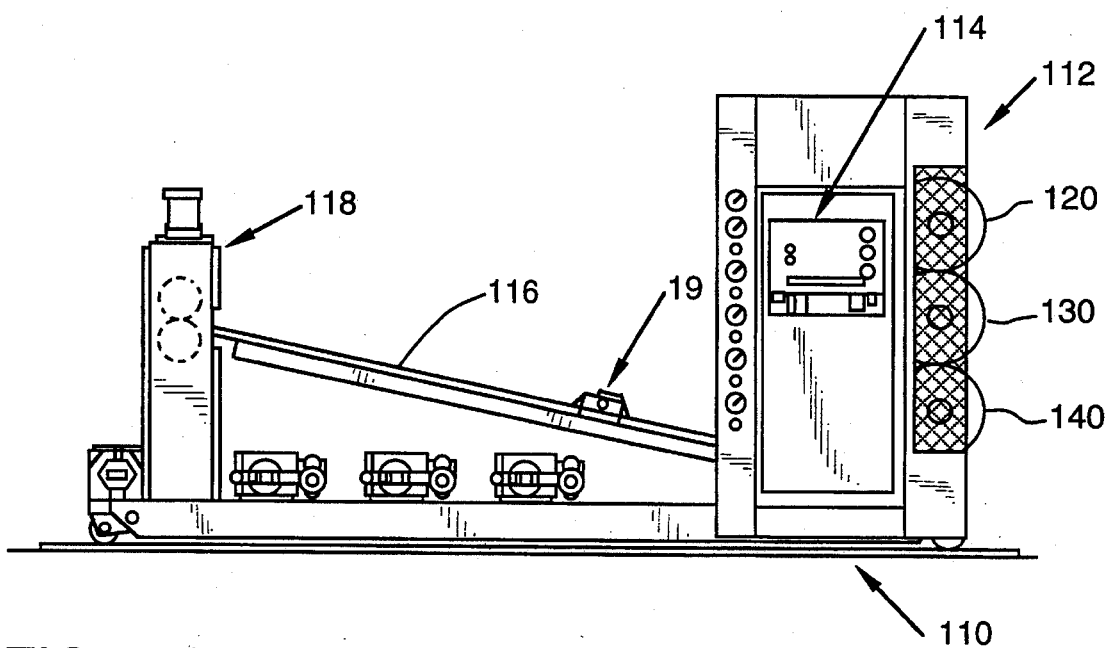
FIG. 1 is a side elevational view of a known flat sheet extrusion system.
Figure 2:
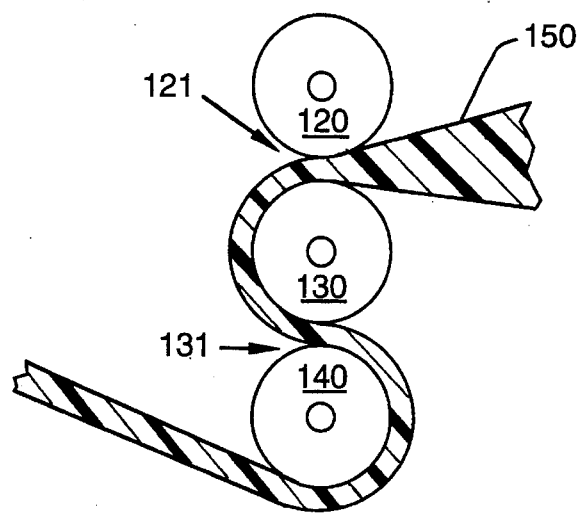
FIG. 2 is a diagrammatic side elevational view of a typical polishing roll arrangement of a flat sheet extrusion system arranged in a "downstack" mode.
Figure 3:
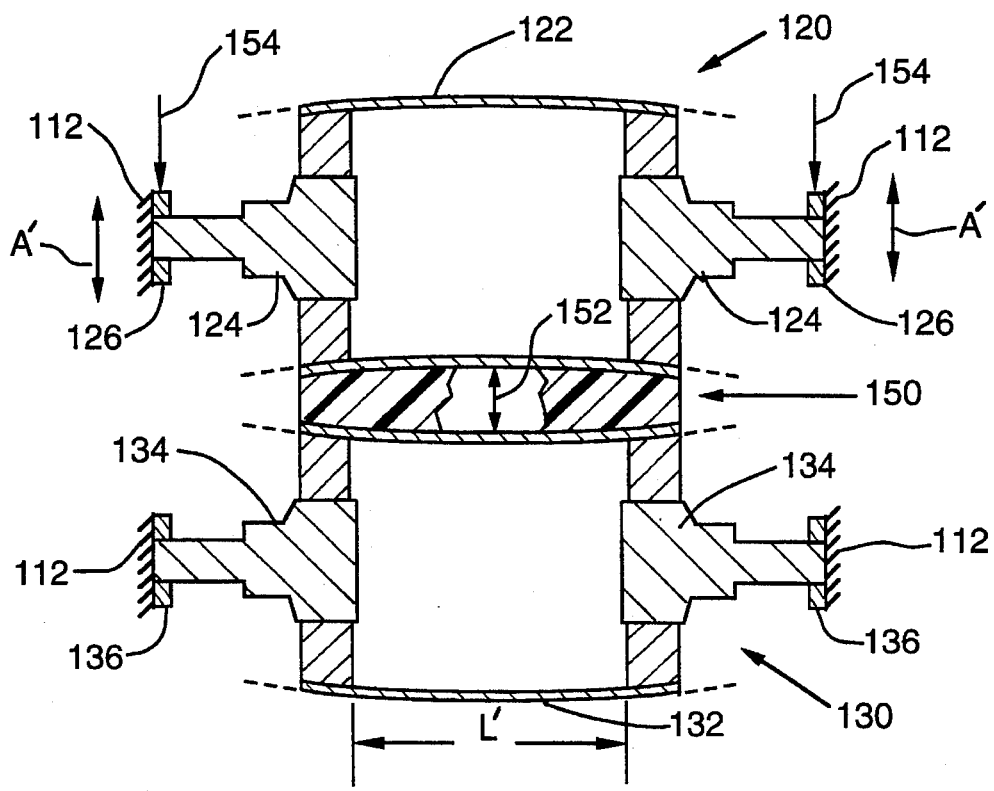
FIG. 3 is a cross sectional elevational view of an arrangement of conventional polishing rolls of the prior art.
Figure 8:
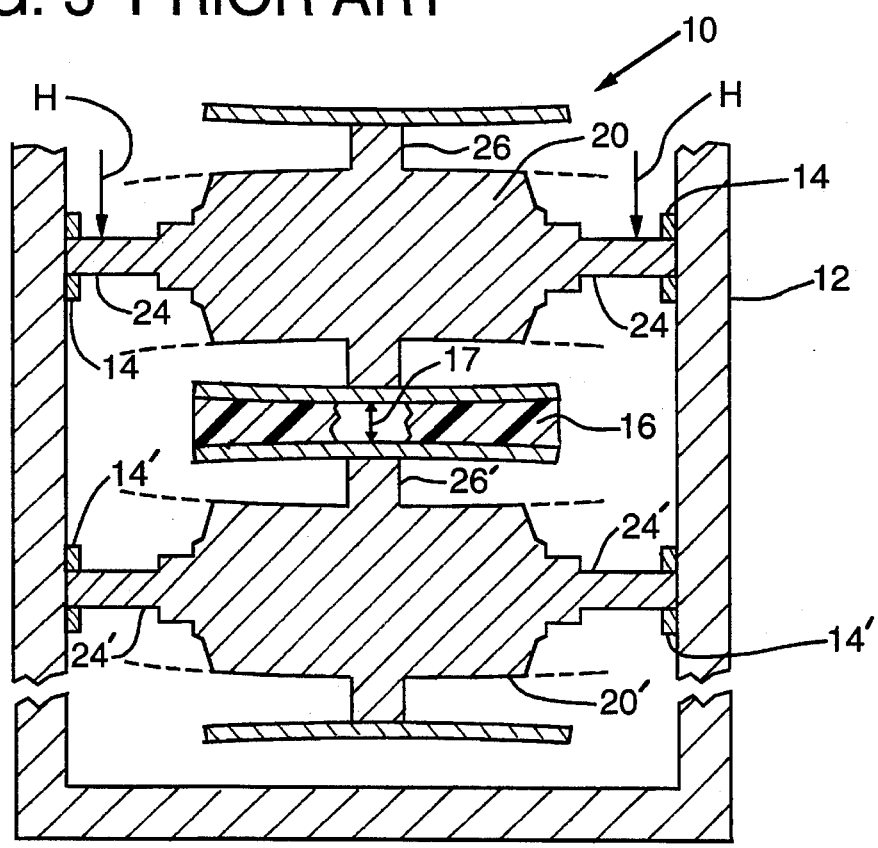
FIG. 8 is a diagrammatic side elevational view of two rolls of the present invention arranged to extrude material therebetween.

The skilled artisan will appreciate that the roll 10 of the subject invention can also be used in pairs for extruding flat sheet material that has a more uniform cross-sectional thickness than flat sheet material that is extruded between pairs of known conventional rolls. FIG. 8 is a diagrammatic illustration of two rolls (10, 10') of the present invention constructed in the manner described above and being arranged in a conventional flat sheet extrusion apparatus, generally designated as 12. While FIG. 8 depicts the rolls (10, 10') as being supported on enlarged center segments (26, 26') of core members (20, 20') such that the ends of shell assemblies (40, 40') can deflect relative to their corresponding cores (20, 20'), the reader will appreciate that the rolls (10, 10') are fabricated in the manner described above and depicted in FIGS. 4–6.

As can be seen in FIG. 8, the journals 24' of roll 10' are received in corresponding bearings 14' that are nonmovably mounted to the extrusion apparatus 12. Roll 10 is received in bearings 14 that are mounted to apparatus 12 such that they may be selectively adjusted to increase or decrease the amount of clearance provided between the shell assemblies (40, 40'). During the flat sheet extrusion operation, the roll 10 is positioned relative to the roll 10' such that when the molten material passes between the shell assemblies (40, 40'), the shell assemblies deflect in the manner depicted in FIG. 8. Conversely, however, the roll cores (20, 20') will deflect in directions that are opposite to the directions in which their corresponding shell assemblies (40, 40') are deflecting. Those of ordinary skill in the art will appreciate that the deflection of shell assemblies 40 and roll cores 20 have been greatly exaggerated in FIG. 8 for explanatory purposes. It will be nonetheless appreciated that the advantage of this arrangement is in the inherent relationship between the bending of the rolls and the unsupported lengths "L" of shell assemblies (40, 40'). Moreover, as is evident from the formulas recited above, the center supported shell assembly of the present invention will deflect much less than a conventional roll having an identical shell length "L'" under identical loading conditions. For example, the deflection of a roll 10 constructed in a preferred manner as described above, having an 11.838" diameter shell assembly 40 and a 90" shell length "L", has one fifth of the deflection of a conventional roll also having the same shell length, load and moment of inertia.

While the rolls of the present invention were herein described as being most particularly suited for use in connection with flat sheet extrusion systems for extruding polymeric materials into flat sheets having uniform thicknesses, the skilled artisan will readily appreciate that the roll of the present invention can be used in other applications wherein the heat transfer characteristics of the roll and roll deflection are of critical concern. Thus, the scope of protection of the present invention should not be limited to use in connection with flat sheet extrusion systems used in extruding polymer material into flat sheets.

Those of ordinary skill in the art will appreciate, however, that the roll of the present invention solves many problems associated with extruding flat sheet materials. In particular, the roll of the present invention can be used in connection with conventional rolls to extrude flat sheet materials having uniform thicknesses. Also, the rolls of the present invention can be used in pairs to extrude flat sheet materials that have thickness that are more uniform than the thicknesses of similar materials that have been extruded between a pair of conventional rolls. In addition, due to the unique construction of the present invention, the heat transfer capabilities of the present roll are not compromised in order to control deflection of the roll's outer shell. In fact, experiments have shown that when used in connection with a conventional roll having a shell length "L'" of 65", a roll constructed in a preferred manner as described above having a center supported shell assembly having an unsupported length of 27.5", can extrude polymer material such as thermoplastic polyester into flat sheet having a substantially uniform thickness of 6 mils. It was previously impossible to extrude such polymer material into flat sheet having a uniform thickness of less than 16 mils using prior conventional rolls due to the material's propensity to cool upon initial contact with the polishing rolls and its tendency to generate high separating forces which cause excessive roll deflection.

Thus, the roll of the present invention has solved many of the problems associated with conventional extrusion rolls. It will be understood, however, that various changes in the details, materials and arrangements of parts which have been herein described and illustrated in order to explain the nature of the invention may be made by those skilled in the art within the principle and scope of the invention as expressed in the appended claims.

What is claimed is:

1. A roll comprising:

an axially extending core member having a central portion and two end portions;

duct means in said core for receiving a fluid medium therein;

an inner shell member having a central portion and two distal end portions, said inner shell member surrounding said core member and being substantially coextensive therewith, said central portion of said inner shell member being attached to said central portion of said core member such that said distal end portions of said inner shell member are unsupported and are permitted to deflect in relation to the adjacent end portions of said core member;

a first spacer means attached to said inner shell member;

a middle shell member surrounding said inner shell member and being substantially coextensive therewith, said middle shell member being received on said first spacer means and cooperating therewith to form a first spiral passageway between said inner shell member and said middle shell member, said first spiral passageway communicating with said duct means in said core member;

a second spacer means attached to said middle shell member; and an outer shell member having a central portion and two distal ends, said outer shell member surrounding said middle shell member and being substantially coextensive therewith, said outer shell member being received on said second spacer means and cooperating therewith to form a second spiral passageway between said middle shell member and said outer shell member, said second spiral passageway communicating with said first spiral passageway.

2. The roll of claim 1 further comprising means for attaching said distal ends of said outer shell to the corresponding distal ends of said inner shell.

3. A roll comprising:

an axially extending core having a central portion and two end portions, said central portion having a diameter that is larger than the diameters of said end portions of said core;

an inner shell member having a central portion and two distal end portions, said inner shell member surrounding said core member and being substantially coextensive therewith;

means for mounting said inner shell member to said core at their respective center portions whereby said distal end portions of said inner shell member are unsupported and are permitted to deflect in relation to the adjacent end portions of said core;

a first spacer means attached to said inner shell member;

a middle shell member surrounding said inner shell member and being substantially coextensive therewith, said middle shell member being received on said first spacer means and cooperating therewith to form a first spiral passageway between said inner shell and said middle shell;

a second spacer means attached to said middle shell member;

an outer shell member having a central portion and two distal ends, said outer shell member surrounding said middle shell member and being substantially coextensive therewith, said outer shell member being received on said second spacer means and cooperating therewith to form a second spiral passageway between said middle shell and said outer shell;

means for attaching said distal ends of said outer shell member to the corresponding distal ends of said inner shell member to form a third passageway, said third passageway communicating with said first and second passageways to permit fluid to flow therebetween; and duct means in said core, said duct means communicating with said first, second and third passageways to permit a fluid medium to flow from a source attached to said duct means to said first, second and third passageways.

4. The roll of claim 1 wherein the diameter of said central portion of said axially extending core is larger than the diameters of said end portions of said axially extending core.

* * * * *